(12) United States Patent
Seltzer et al.

(10) Patent No.: US 9,009,039 B2
(45) Date of Patent: Apr. 14, 2015

(54) NOISE ADAPTIVE TRAINING FOR SPEECH RECOGNITION

(75) Inventors: Michael Lewis Seltzer, Seattle, WA (US); James Garnet Droppo, Carnation, WA (US); Ozlem Kalinli, Los Angeles, CA (US); Alejandro Acero, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1064 days.

(21) Appl. No.: 12/483,262

(22) Filed: Jun. 12, 2009

(65) Prior Publication Data

US 2010/0318354 A1 Dec. 16, 2010

(51) Int. Cl.
G10L 15/20 (2006.01)
G10L 15/06 (2013.01)
G10L 15/14 (2006.01)

(52) U.S. Cl.
CPC .............. *G10L 15/063* (2013.01); *G10L 15/20* (2013.01); *G10L 15/144* (2013.01)

(58) Field of Classification Search
USPC ........... 704/256.4, 226, 256.1, 256, 246, 239, 704/233; 702/20; 381/380; 375/141; 370/335, 332; 324/300
See application file for complete search history.

(56) References Cited

U.S. PATENT DOCUMENTS

| | | | |
|---|---|---|---|
| 6,026,359 A * | 2/2000 | Yamaguchi et al. ....... | 704/256.4 |
| 7,047,047 B2 | 5/2006 | Acero et al. | |
| 7,050,954 B2 | 5/2006 | Singh et al. | |
| 8,358,631 B2 * | 1/2013 | Hafeez ........................... | 370/332 |
| 2003/0191636 A1 * | 10/2003 | Zhou .............................. | 704/226 |
| 2003/0233197 A1 * | 12/2003 | Padilla et al. ................... | 702/20 |
| 2004/0019483 A1 * | 1/2004 | Deng et al. ..................... | 704/239 |
| 2004/0143435 A1 * | 7/2004 | Deng et al. ..................... | 704/256 |
| 2005/0185813 A1 * | 8/2005 | Sinclair et al. ................ | 381/380 |
| 2006/0136203 A1 * | 6/2006 | Ichikawa ....................... | 704/226 |
| 2006/0178886 A1 * | 8/2006 | Braho et al. ................... | 704/246 |

(Continued)

FOREIGN PATENT DOCUMENTS

EP 1178465 B1 2/2002

OTHER PUBLICATIONS

Moreno, et al., "A Vector Taylor Series Approach for Environment-Independent Speech Recognition", Retrieved at <<http://www.cs.cmu.edu/~robust/Papers/icassp96-vts.pdf>>, IEEE International Conference on Acoustics, Speech, and Signal Processing, vol. 2, May 7-10, 1996, pp. 5.

(Continued)

*Primary Examiner* — Michael Colucci
(74) *Attorney, Agent, or Firm* — Sandy Swain; Judy Yee; Micky Minhas

(57) ABSTRACT

Technologies are described herein for noise adaptive training to achieve robust automatic speech recognition. Through the use of these technologies, a noise adaptive training (NAT) approach may use both clean and corrupted speech for training. The NAT approach may normalize the environmental distortion as part of the model training. A set of underlying "pseudo-clean" model parameters may be estimated directly. This may be done without point estimation of clean speech features as an intermediate step. The pseudo-clean model parameters learned from the NAT technique may be used with a Vector Taylor Series (VTS) adaptation. Such adaptation may support decoding noisy utterances during the operating phase of a automatic voice recognition system.

12 Claims, 4 Drawing Sheets

(56) References Cited

U.S. PATENT DOCUMENTS

| | | | |
|---|---|---|---|
| 2007/0030827 A1* | 2/2007 | Rui et al. | 370/335 |
| 2007/0033034 A1 | 2/2007 | Yao | |
| 2007/0036202 A1* | 2/2007 | Ge et al. | 375/141 |
| 2007/0055508 A1* | 3/2007 | Zhao et al. | 704/226 |
| 2008/0177546 A1 | 7/2008 | Deng et al. | |
| 2008/0208578 A1 | 8/2008 | Geller | |
| 2008/0215321 A1 | 9/2008 | Droppo et al. | |
| 2009/0063144 A1 | 3/2009 | Rose et al. | |
| 2009/0144059 A1* | 6/2009 | Yu et al. | 704/256.1 |
| 2010/0262423 A1* | 10/2010 | Huo et al. | 704/233 |
| 2011/0210728 A1* | 9/2011 | Somasundaram et al. | 324/300 |

OTHER PUBLICATIONS

Acero, et al., "HMM Adaptation using Vector Taylor Series for Noisy Speech Recognition", Retrieved at <<http://research.microsoft.com/pubs/76536/2000-alexac-icslpb.pdf>>, In Proceedings of ICSLP 2000, vol. 3, Oct. 2000, pp. 4.

Frey, et al., "Learning Dynamic Noise Models from Noisy Speech for Robust Speech Recognition", Retrieved at <<http://books.nips.cc/papers/txt/nips14/SP05.txt>>, In NIPS14, 2001, pp. 1-26.

Gales, et al., "Model-Based Approaches to Robust Speech Recognition", Retrieved at <<http://svr-www.eng.cam.ac.uk/~mjfg/mjfg_edin08.pdf>>, Cambridge University Engineering Department, Oct. 3, 2008, pp. 34.

Deng, et al., "Large-Vocabulary Speech Recognition under Adverse Acoustic Environments", Retrieved at <<http://research.microsoft.com/pubs/76541/2000-deng-icslp.pdf>>, In Proceedings of International Conference on Spoken Language Processing, Oct. 2000, pp. 4.

Kim, et al., "Speech Recognition in Noisy Environments using First-Order Vector Taylor Series", Retrieved at <<http://citeseerx.ist.psu.edu/viewdoc/download;jsessionid=4955DB253305C3211A2D303EF74D1622?doi=10.1.1.51.3179&rep=rep1&type=pdf>>, Speech Communication, vol. 24, 1998, pp. 39-49.

Anastasakos, et al., "A Compact Model for Speaker-Adaptive Training", Retrieved at <<http://reference.kfupm.edu.sa/content/c/o/a_compact_model_for_speaker_adaptive_tra_169780.pdf>>, Proceedings of Fourth International Conference on Spoken Language, Oct. 3-6, 1996, pp. 4.

Leggetter, et al., "Maximum Likelihood Linear Regression for Speaker Adaptation of Continuous Density Hidden Markov Models", Retrieved at <<citeseerx.ist.psu.edu/viewdoc/download?doi=10.1.1.89.2050&rep=rep1&type=pdf>>, Computer Speech and Language, vol. 9, No. 2, 1995, pp. 171-185.

Cui, et al., "Noise Robust Speech Recognition using Feature Compensation Based on Polynomial Regression of Utterance SNR", Retrieved at <<http://ieeexplore.ieee.org/stamp/stamp.jsp?arnumber=01518916>>, IEEE Transactions on Speech and Audio Processing, vol. 13, No. 6, Nov. 2005, pp. 1161-1172.

Gales, et al., "An Improved Approach to the Hidden Markov Model Decomposition of Speech and Noise", Retrieved at <<http://ieeexplore.ieee.org/stamp/stamp.jsp?arnumber=00225929>>, IEEE International Conference on Acoustics, Speech, and Signal Processing, vol. 1, Mar. 23-26, 1992, pp. 233-236.

Li, et al., "High-Performance HMM Adaptation with Joint Compensation of Additive and Convolutive Distortions via Vector Taylor Series", Retrieved at <<http://ieeexplore.ieee.org/stamp/stamp.jsp?tp=&arnumber=4430085&isnumber=4430068>>, IEEE Workshop on Automatic Speech Recognition & Understanding, Dec. 9-13, 2007, pp. 65-70.

Dempster, et al., "Maximum Likelihood from Incomplete Data via the EM Algorithm", Retrieved at <<http://www.biostat.jhsph.edu/~yonchen/EM.pdf>>, Journal of the Royal Statistical Society. Series B (Methodological), vol. 39, No. 1, 1977, pp. 39.

Rabiner, Lawrence R., "A Tutorial on Hidden Markov Models and Selected Applications in Speech Recognition", Retrieved at <<http://www.cs.ubc.ca/~murphyk/Bayes/rabiner.pdf>>, Proceedings of the IEEE, vol. 77, No. 2, pp. 257-286.

Liao, et al., "Adaptive Training with Joint Uncertainty Decoding for Robust Recognition of Noisy Data", Retrieved at <<http://mi.eng.cam.uk/~mjfg/liao_ICASSP07.pdf>>, IEEE International Conference on Acoustics, Speech, and Signal Processing, vol. 4, Apr. 15-20, 2007, pp. 4.

Young, S.J., "The HTK Hidden Markov Model Toolkit: Design and Philosophy", Retrieved at <<http://citeseerx.ist.psu.edu/viewdoc/download;jsessionid=E72D34B43E13C010ED0F6E32A0047850?doi=10.1.1.17.8190&rep=rep1&type=pdf>>, Technical Report, CUED/F-INFENG/TR.152, University of Cambridge: Department of Engineering, Sep. 6, 1994, pp. 28.

Pearce, et al., "The Aurora Experimental Framework for the Performance Evaluation of Speech Recognition Systems uncer Noisy Conditions", Retrieved at <<http://dnt.kr.hs-niederrhein.de/papers/icslp2000_final_footer.pdf>>, In the 6th International Conference on Spoken Language Processing, Oct. 16-20, 2000, pp. 4.

Moreno, et al., "Speechdat-Car: A Large Speech Database for Automotive Environments", Retrieved at <<http://perso.telecom-paristech.fr/~grichard/Publications/PaperLREC.pdf>>, Proceedings of 2nd International Conference on Language Resources and Evaluation, 2000, pp. 6.

Macho, et al., "Evaluation of a Noise-Robust DSR Front-End on Aurora Databases", Retrieved at <<http://thamakau.usc.edu/Proceedings/ICSLP%202002/ICSLP/PDF/AUTHOR/SL021969.PDF>>, In ICSLP-2002, Proceedings of 7th International Conference on Spoken Language Processing, Sep. 16-20, 2002, pp. 17-20.

Gong, Yifan, "A Method of Joint Compensation of Additive and Convolutive Distortions for Speaker-Independent Speech Recognition", Retrieved at <<http://ieeexplore.ieee.org/stamp/stamp.jsp?arnumber=01495479>>, IEEE Transactions on Speech and Audio Processing, vol. 13, No. 5, Sep. 2005, pp. 975-983.

Deng, et al., "Recursive Estimation of Nonstationary Noise using Iterative Stochastic Approximation for Robust Speech", Retrieved at <<http://research.microsoft.com/pubs/63607/2003-deng-trans.pdf>>, IEEE Transactions on Speech and Audio Processing, vol. 11, No. 6, Nov. 2003, pp. 1-13.

Moreno, Pedro J., "Speech Recognition in Noisy Environments", Retrieved at <<http://www.cs.cmu.edu/~robust/Thesis/pjm_thesis.pdf>>, A Thesis Submitted in Partial Fulfillment of the Requirements for the Degree of Doctor of Philosophy, Department of Electrical and Computer Engineering, Carnegie Mellon University, Apr. 22, 1996, pp. 130.

Li, et al., "Incremental Online Feature Space MLLR Adaptation for Telephony Speech Recognition", Retrieved at <<http://people.sabanciuniv.edu/haerdogan/pubs/li02iof.pdf>>, 7th International Conference on Spoken Language Processing, Sep. 16-20, 2002, pp. 4.

Gales, M.J.F., "Maximum Likelihood Linear Transformations for HMM-Based Speech Recognition", Retrieved at <<http://citeseerx.ist.psu.edu/viewdoc/download;jsessionid=F81292B85FE68BD9A044BBF2FE27C241?doi=10.1.1.37.8252&rep=rep1&type=pdf>>, Technical Report, CUED/F-INFENG/TR 291, Cambridge University Engineering Department, May 1997, pp. 20.

Saon, et al., "Linear Feature Space Projections for Speaker Adaptation", Retrieved at <<http://research.microsoft.com/en-us/um/people/gzweig/pubs/icassp01.pdf>>, IEEE International Conference on Acoustics, Speech, and Signal Processing, vol. 1, 2001, pp. 4.

Rabiner. Lawrence R., "A Tutorial on Hidden Marov Models and Selected Application in Speech Recognition", Retrieved at <<http://www.cs.ubc.ca/~murphyk/Bayes/rabiner.pdf>>, Proceedings of the IEEE, vol. 77, No. 2, Feb. 1989, pp. 257-286.

Minami, Y. et al., "Improved extended HMM composition by incorporating power variance" Spoken Language, 1996, ICSLP 96. Proceedings, vol. 2, pp. 1109-1112.

* cited by examiner

NOISE ADAPTIVE TRAINING FOR SPEECH RECOGNITION

BACKGROUND

Automatic speech recognition (ASR) techniques may be employed in computer systems and other electronic systems to recognize human speech. The speech may be recognized as words, phrases, sentences, commands, or other such speech elements. The performance of ASR presents various challenges related to environmental distortion. Estimating distortion parameters accurately can be quite difficult. One cause of poor ASR performance is a mismatch between training conditions and operating conditions. For example, systems may be trained without environmental distortion or noise, while operating conditions may include varying environmental distortions and noise. In traditional ASR methods, acoustic models are frequently trained using clean speech without noise or distortion.

It is with respect to these considerations and others that the disclosure made herein is presented.

SUMMARY

Technologies are described herein for noise adaptive training to achieve robust automatic speech recognition. Through the use of these technologies, a noise adaptive training (NAT) approach may use both clean and corrupted speech for training. The NAT approach may normalize environmental distortion and noise as part of the model training. A set of underlying "pseudo-clean" model parameters may be estimated directly. This may be done without point estimation of clean speech features as an intermediate step. The pseudo-clean model parameters learned from the NAT technique may be used with a Vector Taylor Series (VTS) adaptation. Such adaptation may support decoding noisy utterances during the operating phase of the automatic voice recognition system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
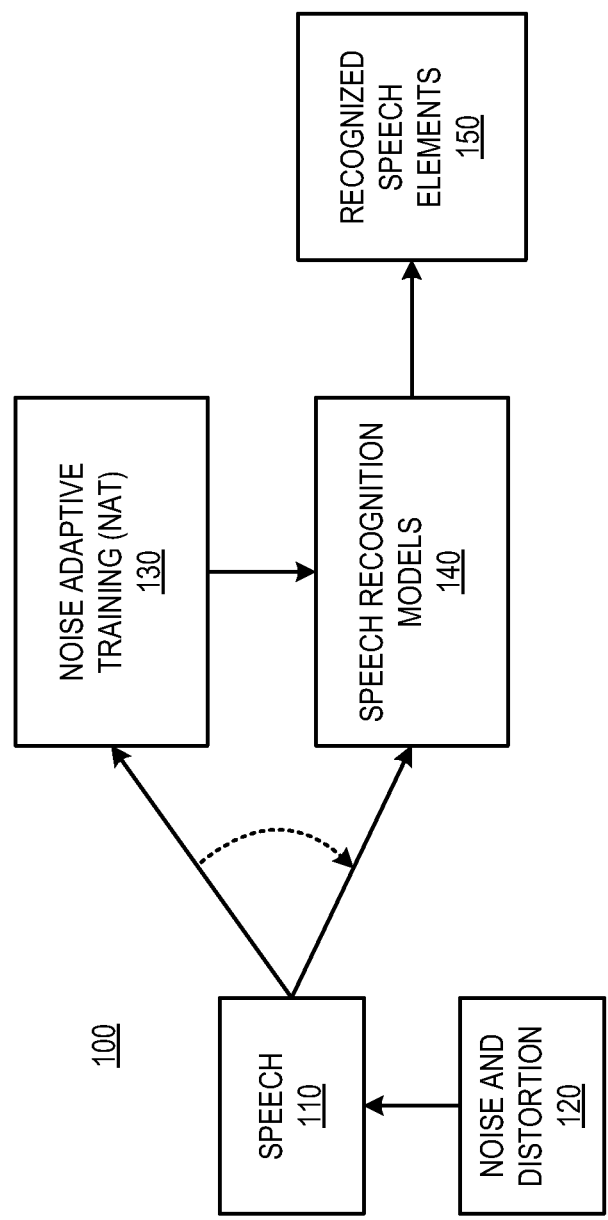
FIG. 1 is a block diagram illustrating a speech recognition system using a noise adaptive training module according to one or more embodiments presented herein.

The following detailed description is directed to technologies for noise adaptive training to achieve robust automatic speech recognition. Through the utilization of the technologies and concepts presented herein, noise adaptive training (NAT) can support multi-condition training. The NAT technique can use multi-condition utterances for training. For example, either clean or corrupted speech may be used for training. The corrupted speech may be mitigated by integrating environmental distortion normalization within the Hidden Markov Model (HMM) training using the NAT technique.

While some traditional approaches operate at a front-end to generate point estimates of clean features from noisy ones, the NAT approach presented herein supports estimations performed in the model domain. Model domain methods may generally perform better than front-end feature enhancement methods. NAT can support model adaptation using Vector Taylor Series (VTS) adaptation or other methods of HMM adaptation. Once the HMM parameters have been trained, the HMM models may be adapted to the noise conditions of test utterances. This adaptation may be supported at the decoder using VTS adaptation or some other method of HMM adaptation.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, concepts and technologies for noise adaptive training to achieve robust automatic speech recognition will be described.

Turning now to FIG. 1, a block diagram illustrates a speech recognition system 100 using a noise adaptive training module 130 according to one or more embodiments presented herein. A signal representing speech 110 can include noise and distortion 120. The noise can be additive such as effects due to interference. The noise can be modeled as random noise such as thermal noise, white noise, Gaussian noise, or otherwise. The distortion may be due to the channel from the speaker of the speech 110 to the input of the signal. The channel may include one or more microphones, multi-path echoes between the speaker and the microphones, physiological features of the speaker, other channel distortion sources, or any combination thereof.

In a training phase, the speech 110 may take on the form of training utterances. These training utterances may be provided to a noise adaptive training (NAT) module 130. The NAT module 130 can use the training utterances to train one or more speech recognition models 140. In an operating phase, the speech 110 may be processed by the trained speech recognition models 140 to extract recognized speech elements 150. The speech elements may be words, phrases, sentences, commands, any other speech elements, or any combination thereof.

Training may involve developing one or more Hidden Markov Models (HMM) of the speech. An HMM associated with the voice recognition system 100 may be adapted using a Vector Taylor Series (VTS). According to embodiments, the speech 110 may be clean, time domain speech represented as the x[m]. The speech 110 may be corrupted by noise and distortion 120 in the form of additive noise n[m] and channel distortion h[m] according to the expression:

$$y[m]=x[m]*h[m]+n[m]$$

where y[m] is a discrete time representation of the corrupted speech signal and * represents a convolution operator.

The expression for y[m] may be represented in the mel-frequency cepstral coefficient (MFCC) domain. Mel-frequency cepstral coefficients represent the power spectrum of a signal based on a linear cosine transform of a logarithmic power spectrum. In the mel-frequency domain, the frequency bands are spaced to approximate the response of the human auditory system. The MFCC representation for y[m] may be given by:

$$y = x + h + C \log(1 + \exp(C^{-1}(n-x-h)))$$

where C is the discrete cosine transform (DCT) matrix and $C^{-1}$ is its pseudo-inverse. The variables y, x, n, and h are the MFCC vectors corresponding to distorted speech, clean speech, noise, and channel, respectively. According to embodiments, the noise n can be modeled as having a Gaussian probability density function (PDF) with a mean vector $\mu_n$ and a covariance matrix $\Sigma_n$. The channel h can be modeled as having a PDF of the Kronecker delta function $\delta(h-\mu_h)$. The Jacobian of y with respect to x, h, and n evaluated at a fixed point ($\mu_{x,0}, \mu_{h,0}, \mu_{n,0}$) can be expressed as:

$$\frac{\partial y}{\partial x}\bigg|_{(\mu_x,0,\mu_h,0\mu_n,0)} = \frac{\partial y}{\partial h}\bigg|_{(\mu_x,0,\mu_h,0,\mu_n,0)} = G$$

$$\frac{\partial y}{\partial n}\bigg|_{(\mu_x,0,\mu_h,0,\mu_n,0)} = F = I - G$$

where $$G = C \cdot \text{diag}\left(\frac{1}{1 + \exp(C^{-1}(\mu_{n,0} - \mu_{x,0} - \mu_{h,0}))}\right) \cdot C^{-1}$$

with diag( ) representing the diagonal matrix whose elements are equal to the value of the vector in the argument.

The nonlinear equation in the MFCC representation for y can be approximated by using a first order VTS expansion around the point ($\mu_{x,0}, \mu_{h,0}, \mu_{n,0}$) as follows:

$$y \approx \mu_{x,0} + \mu_{h,0} + g_0 + G(x-\mu_{x,0}) + G(h-\mu_{h,0}) + F(n-\mu_{n,0})$$

where $$g_0 = C \log(1 + \exp(C^{-1}(\mu_{n,0} - \mu_{x,0} - \mu_{h,0})))$$

The expectation of the VTS expansion for y can provide a valid expression in the model domain. Thus, the mean vector of the mth Gaussian in the HMM state s may be expressed as:

$$\mu_{y_{sm}} \approx \mu_{x_{sm},0} + \mu_{h,0} + g_{sm,0} + G_{sm}(\mu_{x_{sm}} - \mu_{x_{sm},0}) + G_{sm}(\mu_h - \mu_{h,0}) + F_{sm}(\mu_n - \mu_{n,0})$$

Here, G, F, and $g_0$ are functions of the mean of the mth Gaussian in the sth state of the generic HMM $\mu_{x_{sm},0}$. Assuming x and n are independent, and given the noise covariance $\Sigma_n$, the covariance matrix of the adapted HMM, $\Sigma_{y_{sm}}$, can be computed as:

$$\Sigma_{y_{sm}} \approx G_{sm} \Sigma_{s_{sm}} G_{sm}^T + F_{sm} \Sigma_n F_{sm}^T$$

These adaptation relationships for $\mu_{y_{sm}}$ and $\Sigma_{y_{sm}}$ can be applied to the model parameters corresponding to static MFCC features. For the dynamic portions of the features, the following adaptation formulas may be used:

$$\mu_{\Delta y_{sm}} \approx G_{sm} \mu_{\Delta x_{sm}},$$

$$\mu_{\Delta \Delta y_{sm}} \approx G_{sm} \mu_{\Delta \Delta s_{sm}},$$

$$\Sigma_{\Delta y_{sm}} \approx G_{sm} \Sigma_{\Delta x_{sm}} G_{sm}^T + F_{sm} \Sigma_{\Delta n} F_{sm}^T$$

$$\Sigma_{\Delta \Delta y_{sm}} \approx G_{sm} \Sigma_{\Delta \Delta s_{sm}} G_{sm}^T + F_{sm} \Sigma_{\Delta \Delta n} F_{sm}^T$$

here, the noise may be assumed to be stationary.

This type of VTS model adaptation traditionally operates with HMMs trained from clean speech 110. For a given test utterance, maximum likelihood (ML) estimates of the noise and channel parameters may be computed under expectation-maximization (EM) using an iterative VTS approximation. These parameters may then be used to adapt the clean speech model parameters using the adaptation formulas above.

The noise adaptive training (NAT) can begin with a quantity of I utterances in a multi-condition training set.

$$y = \{Y^{(i)}\}_{i=1}^T$$

where $Y^{(i)}$ is a sequence of $T_i$ observations corresponding to an $i^{th}$ utterance. The training set may be referred to as multi-condition when the environments for the training utterances may vary and may not all be clean recordings.

The NAT approach can attempt to identify a set of distortion parameters $\Phi = \{\Phi^{(i)}\}_{i=1}^T$ and a set of "pseudo-clean" model parameters $\Lambda_x$ that maximize the likelihood of the multi-condition data when it is transformed to the adapted HMM $\Lambda_y$. The can be expressed in the ML sense as:

$$(\Lambda_X, \Phi) = \underset{(\overline{\Lambda}_X, \Phi)}{\operatorname{argmax}} \prod_{i=1}^I \mathcal{L}(Y^{(i)}; \Lambda_Y^{(i)})$$

where $\Lambda_Y^{(i)} = \text{VTS}(\overline{\Lambda}_X, \overline{\Phi}^{(i)})$ is the adapted HMM using the VTS approach described above. In the ML expression, ($\overline{\Phi}$, $\overline{\Lambda}_X$) and ($\Phi, \Lambda_X$) are the old and new parameter sets, respectively. The NAT approach may assume a distortion model $\Phi^{(i)} = \{\mu_n^{(i)}, \Sigma_n^{(i)}, \mu_h^{(i)}\}$ associated with each utterance. The distortion parameters may be estimated on an utterance-by-utterance basis. The pseudo-clean model may attempt to approximate models trained with clean speech 110.

The NAT approach can use expectation maximization (EM) to learn the distortion model parameters and the pseudo-clean speech model parameters iteratively. This can begin with the following EM auxiliary function:

$$Q(\Phi, \Lambda, \overline{\Phi}, \overline{\Lambda}) = \sum_{i=1}^I \sum_{t,s,m} \gamma_{tsm}^{(i)} \log(p(y_t^{(i)} | s_t = s, m_t = m, \Lambda, \Phi))$$

where $$\sum_{t,s,m}$$

represents $$\sum_{t=1}^{T_i}, \sum_{s=1}^{N_s}, \sum_{m=1}^{N_m}.$$

Also, $N_s$ denotes the number of states, and $N_m$ denotes the number of Gaussian mixtures per state. The posterior probability of the $m^{th}$ Gaussian in the $s^{th}$ state of the HMM for the $i^{th}$ utterance may be given as:

$$\gamma_{tsm}^{(i)} = p(s_t = s, m_t = m | Y^{(i)}, \overline{\Lambda}, \overline{\Phi})$$

The auxiliary function in the M-step of the EM algorithm may be maximized by setting to zero the derivative of Q with respect to $\mu_n$ and $\mu_h$. The following update formulas may be obtained for computing the noise and the channel mean, respectively:

$$\mu_n^{(i)} = \mu_{n,0}^{(i)} + \left\{ \sum_{t,s,m} \gamma_{tsm}^{(i)}(F_{sm}^{(i)})^T \atop (\Sigma_{y_{sm}}^{(i)})^{-1} F_{sm}^{(i)} \right\}^{-1} \times \left\{ \sum_{t,s,m} \gamma_{tsm}^{(i)}(F_{sm}^{(i)})^T (\Sigma_{y_{sm}}^{(i)})^{-1} \atop (y_t^{(i)} - \mu_{x_{sm},0} - \mu_{h,o}^{(i)} - g_{sm,0}^{(i)}) \right\}$$

$$\mu_h^{(i)} = \mu_{h,0}^{(i)} + \left\{ \sum_{t,s,m} \gamma_{tsm}^{(i)}(G_{sm}^{(i)})^T \atop (\Sigma_{y_{sm}}^{(i)})^{-1} G_{sm}^{(i)} \right\}^{-1} \times \left\{ \sum_{t,s,m} \gamma_{tsm}^{(i)}(G_{sm}^{(i)})^T (\Sigma_{y_{sm}}^{(i)})^{-1} \atop (y_t^{(i)} - \mu_{x_{sm},0} - \mu_{h,o}^{(i)} - g_{sm,0}^{(i)}) \right\}$$

While there may not be a closed form solution for the noise covariance, it can be optimized iteratively using Newton's method according to the following update equation:

$$\Sigma_n^{(i)} = \Sigma_{n,0}^{(i)} - \left[ \left( \frac{\partial^2 Q}{\partial^2 \Sigma_n^{(i)}} \right)^{-1} \left( \frac{\partial Q}{\partial \Sigma_n^{(i)}} \right) \right]_{\Sigma_n^{(i)} = \Sigma_{n,0}^{(i)}}$$

The pseudo-clean model parameters $\Lambda_x$ may be updated in a similar fashion to the updating of the distortion parameters. The auxiliary function in the M-step of the EM algorithm may be maximized by setting to zero the derivative of Q with respect to $\mu_{xsm}$. The following three update formulas may be obtained to compute the model mean parameters.

$$\mu_{x_{sm}} = \mu_{x_{sm},0} + \left\{ \sum_{i=1}^{I} \sum_{t=1}^{T_i} \gamma_{tsm}^{(i)}(G_{sm}^{(i)})^T \atop (\Sigma_{y_{sm}}^{(i)})^{-1} G_{sm}^{(i)} \right\}^{-1} \times \left\{ \sum_{i=1}^{I} \sum_{t=1}^{T_i} \gamma_{tsm}^{(i)}(G_{sm}^{(i)})^T (\Sigma_{y_{sm}}^{(i)})^{-1} \atop (y_t^{(i)} - \mu_{x_{sm},0} - \mu_{h,o}^{(i)} - g_{sm,0}^{(i)}) \right\}$$

$$\mu_{\Delta x_{sm}} = \mu_{\Delta x_{sm},0} + \left\{ \sum_{i=1}^{I} \sum_{t=1}^{T_i} \gamma_{tsm}^{(i)}(G_{sm}^{(i)})^T \atop (\Sigma_{\Delta y_{sm}}^{(i)})^{-1} G_{sm}^{(i)} \right\}^{-1} \times \left\{ \sum_{i=1}^{I} \sum_{t=1}^{T_i} \gamma_{tsm}^{(i)}(G_{sm}^{(i)})^T \atop (\Sigma_{\Delta y_{sm}}^{(i)})^{-1} \atop (\Delta y_t^{(i)} - G_{sm,0}^{(i)} \mu_{\Delta x_{sm},0}) \right\}$$

$$\mu_{\Delta\Delta x_{sm}} = \mu_{\Delta\Delta x_{sm},0} + \left\{ \sum_{i=1}^{I} \sum_{t=1}^{T_i} \gamma_{tsm}^{(i)}(G_{sm}^{(i)})^T \atop (\Sigma_{\Delta\Delta y_{sm}}^{(i)})^{-1} G_{sm}^{(i)} \right\}^{-1} \times \left\{ \sum_{i=1}^{I} \sum_{t=1}^{T_i} \gamma_{tsm}^{(i)}(G_{sm}^{(i)})^T \atop (\Sigma_{\Delta\Delta y_{sm}}^{(i)})^{-1} \atop (\Delta\Delta y_t^{(i)} - G_{sm,0}^{(i)} \mu_{\Delta\Delta x_{sm},0}) \right\}$$

Since there may not be a closed form solution for computing the covariance, Newton's method can be used to estimate it iteratively as follows:

$$\Sigma_{x_{sm}} = \Sigma_{x_{sm},0} - \left[ \left( \frac{\partial^2 Q}{\partial^2 \Sigma_{x_{sm}}} \right)^{-1} \left( \frac{\partial Q}{\partial \Sigma_{x_{sm}}} \right) \right]_{\Sigma_{x_{sm}} = \Sigma_{x_{sm},0}}$$

The covariance matrices for dynamic features may be computed in a similar fashion by replacing the static parameters with the dynamic parameters. It may be assumed that the covariance matrix is diagonal as in traditional acoustic model training. The transition probabilities, the initial probabilities, and the mixture weights for the pseudo-clean model may be computed in a similar fashion to ML training for the HMMs but instead using the new posterior probability.

Figure 2:
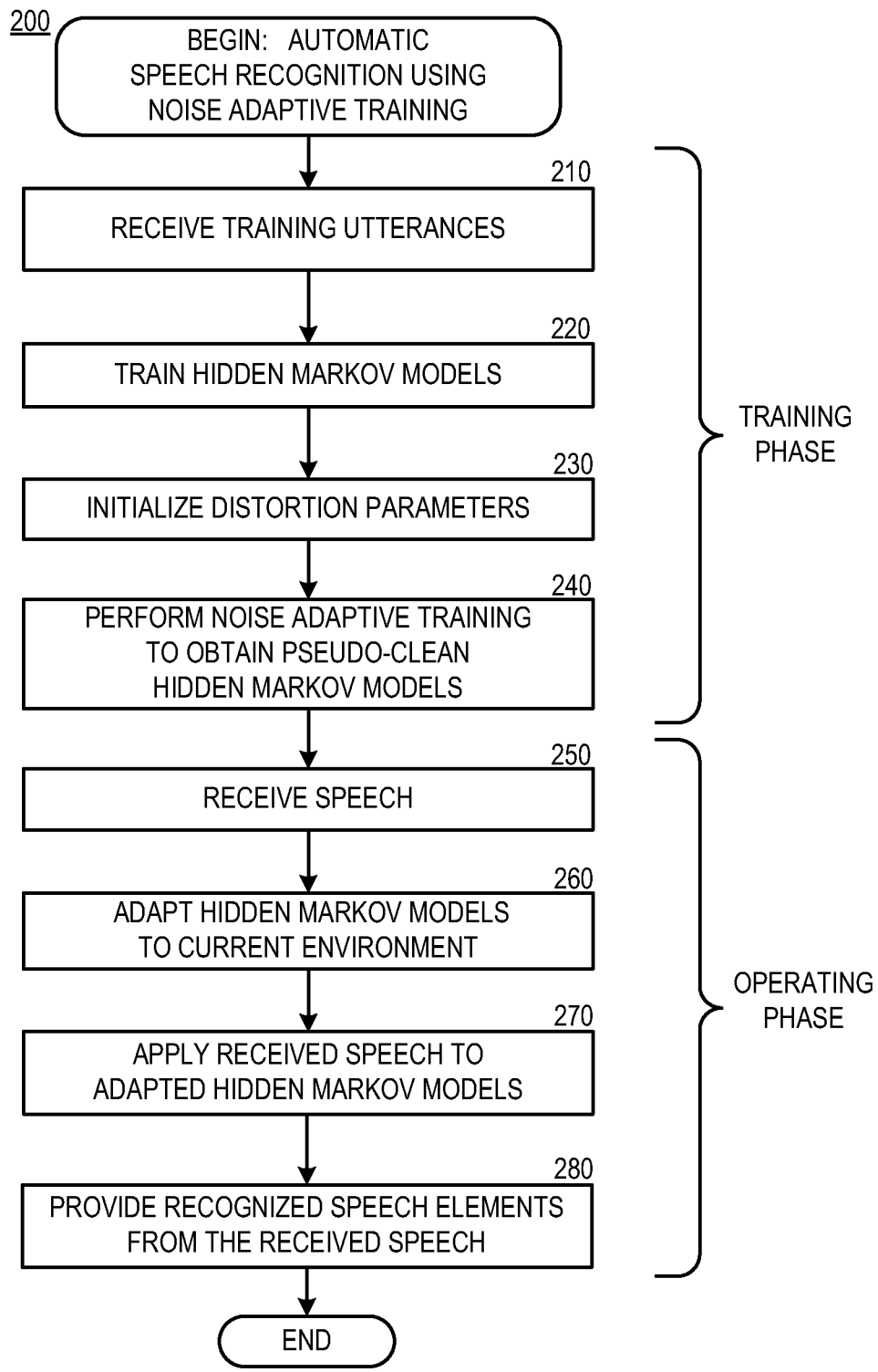
FIG. 2 is a flow diagram showing an illustrative process for automatic speech recognition using noise adaptive training according to one or more embodiments presented herein.

Referring now to FIG. 2, additional details will be provided regarding the embodiments presented herein for noise adaptive training to achieve robust automatic speech recognition. In particular, FIG. 2 is a flow diagram illustrating a method 200 for automatic speech recognition using the NAT approach according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may be performed sequentially, in parallel, or in a different order than as described herein.

A method 200 begins at operation 210 where a set of training utterance may be received. The training utterances may be speech 110 with known speech element content, such as known words or phrases. The training utterances may have been recorded as multi-condition utterances where varying environments, and possibly unclean environments, were used while capturing the recordings. In other words, the training utterances may be corrupted by noise and distortion 120.

At operation 220, speech recognition models 140 may be initially trained. For example, Hidden Markov Models (HMM) may be trained using the utterances received in operation 210. The initial training may be used to initialize the $\Lambda_x$ model parameters.

At operation 230, distortion parameters $\Phi$ may be may be initialized for each utterance. An example initialization of the distortion parameters may include setting the channel mean to zero and setting the noise mean and covariance according to the first or last samples of the utterance where no speech is present.

At operation 240, noise adaptive training may be applied to the initialized model parameters and distortion parameters. Additional details concerning the noise adaptive training are discussed with respect to FIG. 3. The operations 210-240 of routine 200 may be considered a training phase of the automatic speech recognition system. Operations 250-270 may be considered the operating phase of the speech recognition system.

At operation 250, speech 110 can be received for processing by the speech recognition system. At operation 260, the hidden Markov models may be adapted according to an environment associated with the speech 110 received at operation 250.

At operation 270, the speech received at operation 250 may be applied to the speech recognition models 140 to recognize speech elements within the received speech. The speech recognition models 140 may include the HMMs initially trained in operation 220 and then adapted in operation 240 using NAT. At operation 280 the speech elements recognized in operation 270 may be provided as an output from the automatic speech recognition system.

Figure 3:
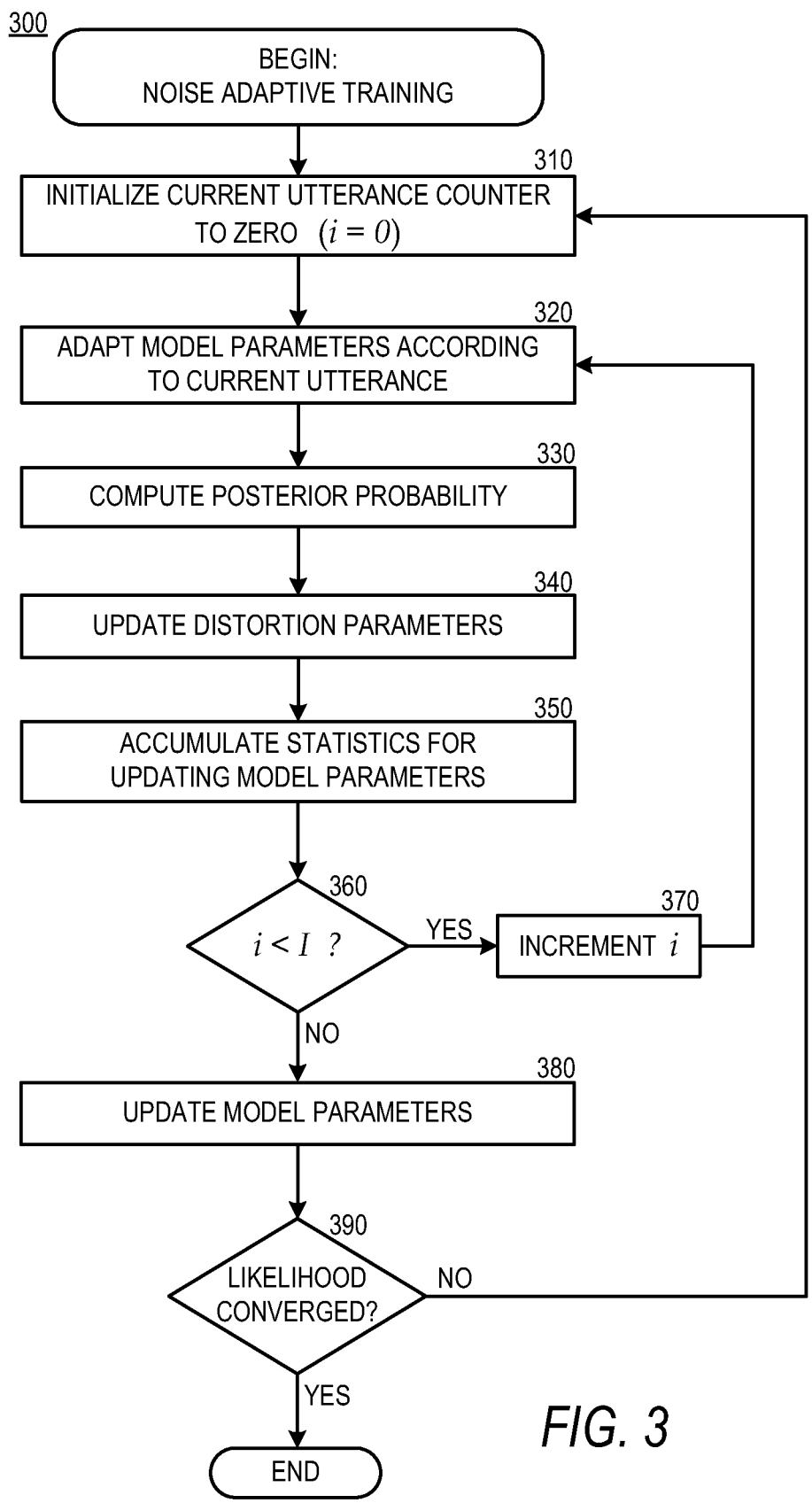
FIG. 3 is a flow diagram showing an illustrative process for noise adaptive training according to one or more embodiments presented herein.

Referring now to FIG. 3, additional details will be provided regarding the embodiments presented herein for noise adaptive training to achieve robust automatic speech recognition. In particular, FIG. 3 is a flow diagram illustrating a method 300 for noise adaptive training according to one or more embodiments presented herein.

The method 300 begins at operation 310 where a current utterance counter may be initialized to zero. This counter may be denoted as i and can be used to count through the quantity I utterances in the training set. At operation 320, the current HMM model parameters $\Lambda_x$ may be adapted to the parameters $\Lambda_y$ according to the adaptation formulas:

$$\mu_{y_{sm}} \approx \mu_{x_{sm},0} + \mu_{h,0} + g_{sm,0} + G_{sm}(\mu_{s_m} - \mu_{x_{sm},0}) + G_{sm}(\mu_h - \mu_{h,0}) + F_{sm}(\mu_n - \mu_{n,0})$$

$$\Sigma_{y_{sm}} \approx G_{sm}\Sigma_{x_{sm}}G_{sm}^T + F_{sm}\Sigma_n F_{sm}^T$$

$$\mu_{\Delta y_{sm}} \approx G_{sm}\mu_{\Delta x_{sm}},$$

$$\mu_{\Delta\Delta y_{sm}} \approx G_{sm}\mu_{\Delta\Delta x_{sm}},$$

$$\Sigma_{\Delta y_{sm}} \approx G_{sm}\Sigma_{\Delta x_{sm}}G_{sm}^T + F_{sm}\Sigma_{\Delta n}F_{sm}^T$$

$$\Sigma_{\Delta\Delta y_{sm}} \approx G_{sm}\Sigma_{\Delta\Delta x_{sm}}G_{sm}^T + F_{sm}\Sigma_{\Delta\Delta n}F_{sm}^T$$

At operation 330, the posterior probability is calculated. The posterior probability of the $m^{th}$ Gaussian in the $s^{th}$ state of the HMM for the $i^{th}$ utterance may be determined from:

$$\gamma_{tsm}^{(i)} = p(s_t = s, m_t = m | Y^{(i)}, \bar{\Lambda}, \bar{\Phi})$$

At operation 340, the distortion parameters $\Phi$ may be updated. According to embodiments, the distortion parameters for each utterance may be updated according to the following three update formulas:

$$\mu_n^{(i)} = \mu_{n,0}^{(i)} + \left\{ \sum_{t,s,m} \gamma_{tsm}^{(i)} (F_{sm}^{(i)})^T (\Sigma_{y_{sm}}^{(i)})^{-1} F_{sm}^{(i)} \right\}^{-1} \times \left\{ \sum_{t,s,m} \gamma_{tsm}^{(i)} (F_{sm}^{(i)})^T (\Sigma_{y_{sm}}^{(i)})^{-1} (y_t^{(i)} - \mu_{x_{sm},0} - \mu_{h,o} - g_{sm,0}) \right\}$$

$$\mu_h^{(i)} = \mu_{h,0}^{(i)} + \left\{ \sum_{t,s,m} \gamma_{tsm}^{(i)} (G_{sm}^{(i)})^T (\Sigma_{y_{sm}}^{(i)})^{-1} G_{sm}^{(i)} \right\}^{-1} \times \left\{ \sum_{t,s,m} \gamma_{tsm}^{(i)} (G_{sm}^{(i)})^T (\Sigma_{y_{sm}}^{(i)})^{-1} (y_t^{(i)} - \mu_{x_{sm},0} - \mu_{h,o} - g_{sm,0}) \right\}$$

$$\Sigma_n^{(i)} = \Sigma_{n,0}^{(i)} - \left[ \left( \frac{\partial^2 Q}{\partial^2 \Sigma_n^{(i)}} \right)^{-1} \left( \frac{\partial Q}{\partial \Sigma_n^{(i)}} \right) \right]_{\Sigma_n^{(i)} = \Sigma_{n,0}^{(i)}}$$

At operation 350, statistics for updating the model parameters $\Lambda_x$ can be accumulated. The matrix and the vector terms for the following four equations may be updated for each Gaussian in the HMM:

$$\mu_{x_{sm}} = \mu_{x_{sm},0} + \left\{ \sum_{i=1}^{I} \sum_{t=1}^{T_i} \gamma_{tsm}^{(i)} (G_{sm}^{(i)})^T (\Sigma_{y_{sm}}^{(i)})^{-1} G_{sm}^{(i)} \right\}^{-1} \times \left\{ \sum_{i=1}^{I} \sum_{t=1}^{T_i} \gamma_{tsm}^{(i)} (G_{sm}^{(i)})^T (\Sigma_{y_{sm}}^{(i)})^{-1} (y_t^{(i)} - \mu_{x_{sm},0} - \mu_{h,o} - g_{sm,0}) \right\}$$

$$\mu_{\Delta x_{sm}} = \mu_{\Delta x_{sm},0} + \left\{ \sum_{i=1}^{I} \sum_{t=1}^{T_i} \gamma_{tsm}^{(i)} (G_{sm}^{(i)})^T (\Sigma_{\Delta y_{sm}}^{(i)})^{-1} G_{sm}^{(i)} \right\}^{-1} \times \left\{ \sum_{i=1}^{I} \sum_{t=1}^{T_i} \gamma_{tsm}^{(i)} (G_{sm}^{(i)})^T (\Sigma_{\Delta y_{sm}}^{(i)})^{-1} (\Delta y_t^{(i)} - G_{sm,0}^{(i)} \mu_{\Delta x_{sm},0}) \right\}$$

$$\mu_{\Delta\Delta x_{sm}} = \mu_{\Delta\Delta x_{sm},0} + \left\{ \sum_{i=1}^{I} \sum_{t=1}^{T_i} \gamma_{tsm}^{(i)} (G_{sm}^{(i)})^T (\Sigma_{\Delta\Delta y_{sm}}^{(i)})^{-1} G_{sm}^{(i)} \right\}^{-1} \times \left\{ \sum_{i=1}^{I} \sum_{t=1}^{T_i} \gamma_{tsm}^{(i)} (G_{sm}^{(i)})^T (\Sigma_{\Delta\Delta y_{sm}}^{(i)})^{-1} (\Delta\Delta y_t^{(i)} - G_{sm,0}^{(i)} \mu_{\Delta\Delta x_{sm},0}) \right\}$$

$$\Sigma_{x_{sm}} = \Sigma_{x_{sm},0} - \left[ \left( \frac{\partial^2 Q}{\partial^2 \Sigma_{x_{sm}}} \right)^{-1} \left( \frac{\partial Q}{\partial \Sigma_{x_{sm}}} \right) \right]_{\Sigma_{x_{sm}} = \Sigma_{x_{sm},0}}$$

At operation 360, it can be determined if all I utterances of the training set have been iterated. If there are additional utterances remaining, the routine 300 can continue to operation 370 where the utterance counter can be incremented. From operation 370, the routine 300 can loop back to operation 320 to iterate over the next utterance. If instead, it is determined at operation 360 that there are no additional utterances to iterate, the routine 300 can continue to operation 380.

At operation 380, the model parameters can be updated according to the statistics accumulated in operation 350. Adapted model parameters $\Lambda_x$ may be generated from the adaptive iterations over the utterances.

At operation 390, it can be determined if the likelihoods are converging. For example, when the average likelihood of the training data is still increasing, convergence may not have been achieved and additional iterations over the utterances may be performed. If it is determined at operation 390 that the likelihoods are not yet converging, the routine 300 may loop back to operation 310 where the utterances are iterated again. If instead, it is determined at operation 390 that the likelihoods are converging, the routine 300 may terminate.

Figure 4:
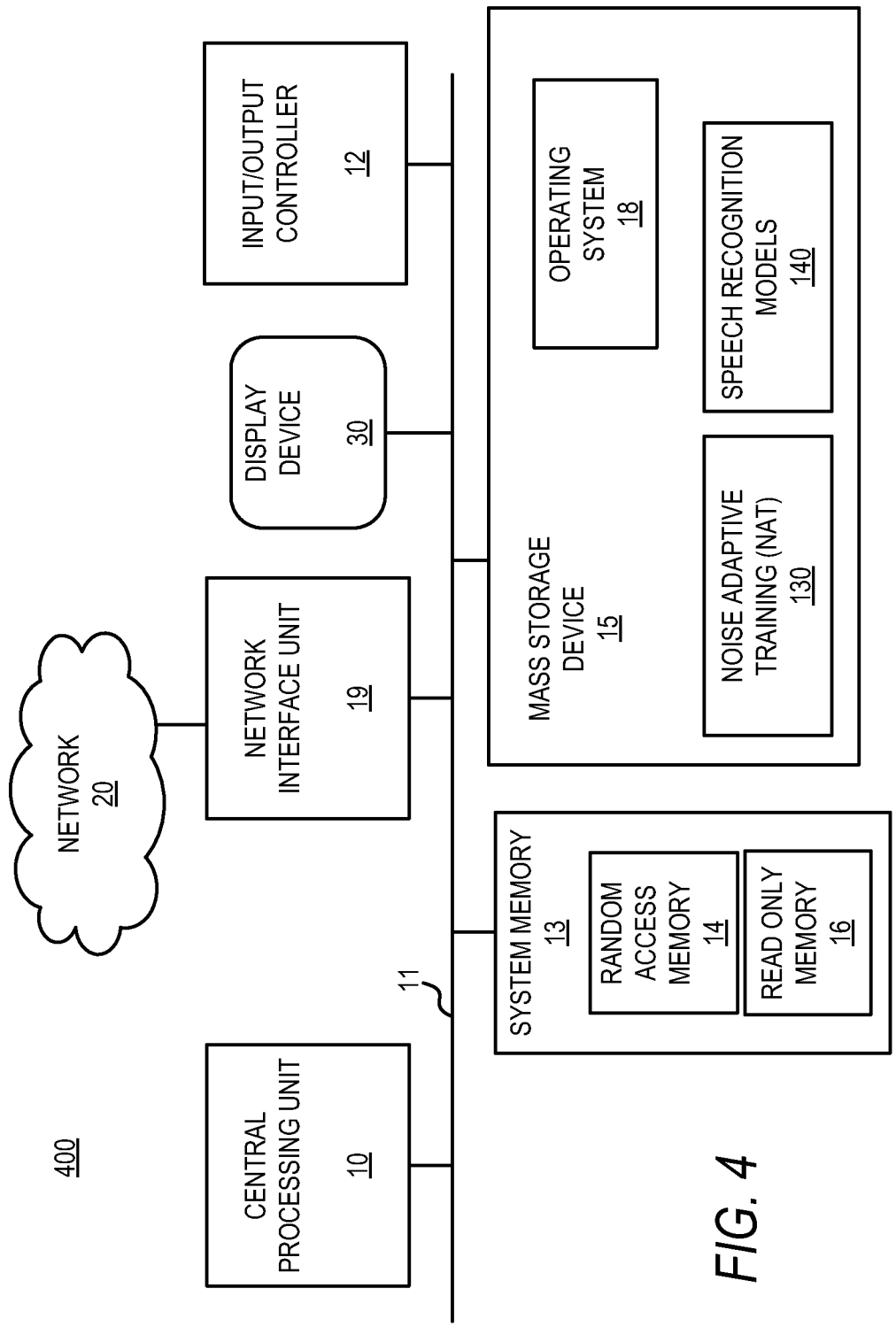
FIG. 4 is a computer architecture diagram showing an illustrative computer hardware architecture for a computing system capable of implementing embodiments presented herein.

Turning now to FIG. 4, an illustrative computer architecture 400 can execute software components described herein for noise adaptive training to achieve robust automatic speech recognition. The computer architecture shown in FIG. 4 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. The computer architecture 400 may apply to the computer executing the program modules for noise adaptive training 130 or storing and processing the speech recognition models 140.

The computer architecture illustrated in FIG. 4 can include a central processing unit 10 (CPU), a system memory 13, including a random access memory 14 (RAM) and a read-only memory 16 (ROM), and a system bus 11 that can couple the system memory 13 to the CPU 10. The system memory 13 may provide memory 120 used for the application 110. A basic input/output system containing the basic routines that help to transfer information between elements within the computer 400, such as during startup, can be stored in the ROM 16. The computer 400 may further include a mass storage device 15 for storing an operating system 18, software, data, and various program modules, such as those associated with the noise adaptive training 130 and the speech recognition models 140. The program modules can execute portions of software components, processes, and routines described herein.

The mass storage device 15 can be connected to the CPU 10 through a mass storage controller (not illustrated) connected to the bus 11. The mass storage device 15 and its associated computer-readable media can provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 170. The computer 400 may connect to the network 170 through a network interface unit 19 connected to the bus 11. It should be appreciated that the network interface unit 19 may also be utilized to connect to other types of networks and remote computer systems. The computer 400 may also include an input/output controller 12 for receiving and processing input from a number of other devices, including a keyboard, mouse, or electronic stylus (not illustrated). Similarly, an input/output controller 12 may provide output to, a printer, or other type of output device (also not illustrated). A display device 30 may be used for providing output from the computer 400 in the form of text, graphics, video, graphical user interface, any other user interface elements, or any combination thereof.

As mentioned briefly above, a number of program modules and data files may be stored in the mass storage device 15 and RAM 14 of the computer 400, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the program modules for noise adaptive training 130 and the speech recognition models 140 for execution by the CPU 10. The mass storage device 15, the ROM 16, and the RAM 14 may also store other types of program modules.

In general, software applications or modules such as those for noise adaptive training 130 or the speech recognition models 140 may, when loaded into the CPU 10 and executed, transform the CPU 10 and the overall computer 400 from general-purpose computing systems into special-purpose computing systems customized to perform robust automatic speech recognition using noise adaptive training (NAT). The CPU 10 may be constructed from any number of transistors or other discrete circuit elements, which may individually or collectively assume any number of states. More specifically, the CPU 10 may operate as one or more finite-state machines, in response to executable instructions contained within the software or modules. These computer-executable instructions may transform the CPU 10 by specifying how the CPU 10 transitions between states, thereby physically transforming the transistors or other discrete hardware elements constituting the CPU 10.

Encoding the software or modules onto the mass storage device 15 may also transform the physical structure of the mass storage device 15 or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for noise adaptive training to achieve robust automatic speech recognition are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for speech recognition, the method comprising computer-implemented operations for:
receiving a set of training speech utterances, wherein one or more of the training speech utterances comprises speech corrupted by noise or distortion;
initializing parameters of a pseudo-clean speech model;
initializing parameters of a distortion model by setting a channel mean to zero and setting a noise mean and a covariance according to one of a first or a last sample of an utterance where no speech is present;
iteratively applying noise adaptive training using the set of training speech utterances to generate a speech recognition model based upon identifying a set of distortion model parameters from the distortion model and identifying a set of pseudo-clean model parameters from the pseudo-clean speech model;
receiving a speech signal to be recognized;
adapting the speech recognition model to a current environment associated with the received speech signal; and
performing speech recognition on the received speech signal using the adapted speech recognition model.

2. The computer-implemented method of claim 1, wherein a first one of the training speech utterances comprises a different noise or distortion than a second one of the training speech utterances.

3. The computer-implemented method of claim 1, wherein the speech recognition model comprises a Hidden Markov Model.

4. The computer-implemented method of claim 1, wherein generating the speech recognition model further comprises incorporating a Vector Taylor Series adaptation into training of the speech recognition model.

5. The computer-implemented method of claim 1, wherein generating the speech recognition model further comprises iterating over the training speech utterances while accumulating statistics to update the speech recognition model.

6. The computer-implemented method of claim 1, wherein generating the pseudo-clean model comprises approximating a model trained with clean speech.

7. A computer system comprising:
a processing unit;
a memory operatively coupled to the processing unit; and
a program module which executes in the processing unit from the memory and which, when executed by the processing unit, causes the computer system to recognize speech by
receiving a set of training speech utterances, wherein one or more of the training speech utterances comprises speech corrupted by noise or distortion;
initializing parameters of a pseudo-clean speech model;
initializing parameters of a distortion model by setting a channel mean to zero and setting a noise mean and a covariance according to one of a first or a last sample of an utterance where no speech is present;
iteratively applying noise adaptive training using the set of training speech utterances to generate a speech recognition model based upon identifying a set of distortion model parameters from the distortion model and identifying a set of pseudo-clean model parameters from the pseudo-clean model;
receiving a speech signal to be recognized;
adapting the speech recognition model to a current environment associated with the received speech signal; and
recognizing speech elements from the received speech signal using the adapted speech recognition model.

8. The computer system of claim 7, wherein a first one of the training speech utterances comprises a different noise or distortion than a second one of the training speech utterances.

9. The computer system of claim 7, wherein the speech recognition model comprises a Hidden Markov Model.

10. The computer system of claim 7, wherein generating the speech recognition model comprises incorporating a Vector Taylor Series adaptation into training of the speech recognition model.

11. The computer system of claim 7, wherein generating the speech recognition model comprises iterating over the training speech utterances while accumulating statistics to update the speech recognition model.

12. A computer-readable medium having computer-executable instructions stored thereon which, when executed by a computer, cause the computer to:
receive a set of training speech utterances, wherein at least one of the training speech utterances comprises speech corrupted by noise or distortion;
initializing parameters of a hidden Markov speech recognition model;
initializing parameters of a distortion model by setting a channel mean to zero and setting a noise mean and a covariance according to one of a first or a last sample of an utterance where no speech is present;
generate an improved hidden Markov speech recognition model using the set of training speech utterances by applying a Vector Taylor Series adaptation to training of the hidden Markov speech recognition model, and generating a set of pseudo-clean model parameters from the hidden Markov speech recognition model and a set of distortion model parameters from the distortion model; and
recognize speech elements using the improved hidden Markov speech recognition model.

* * * * *